UNITED STATES PATENT OFFICE.

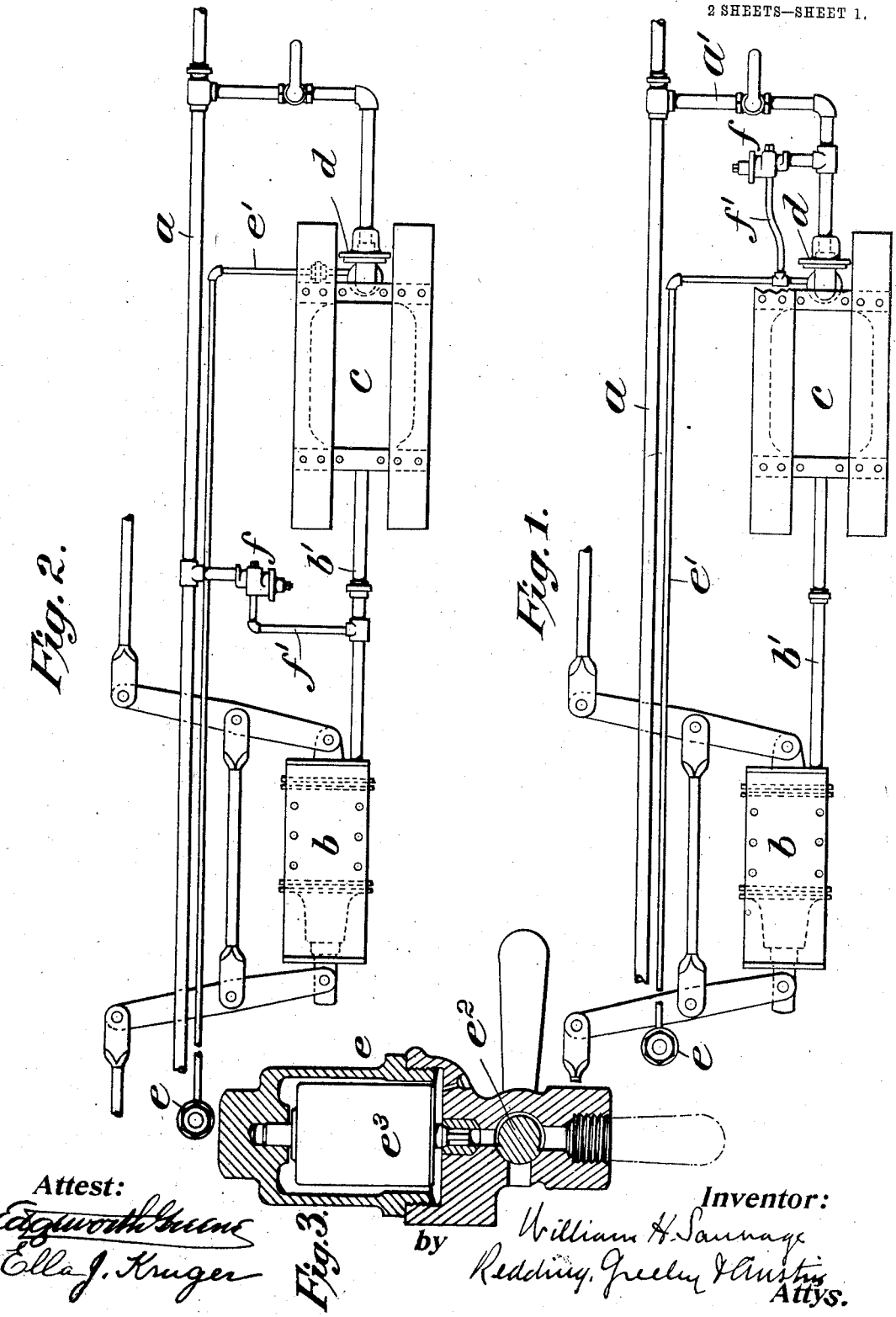

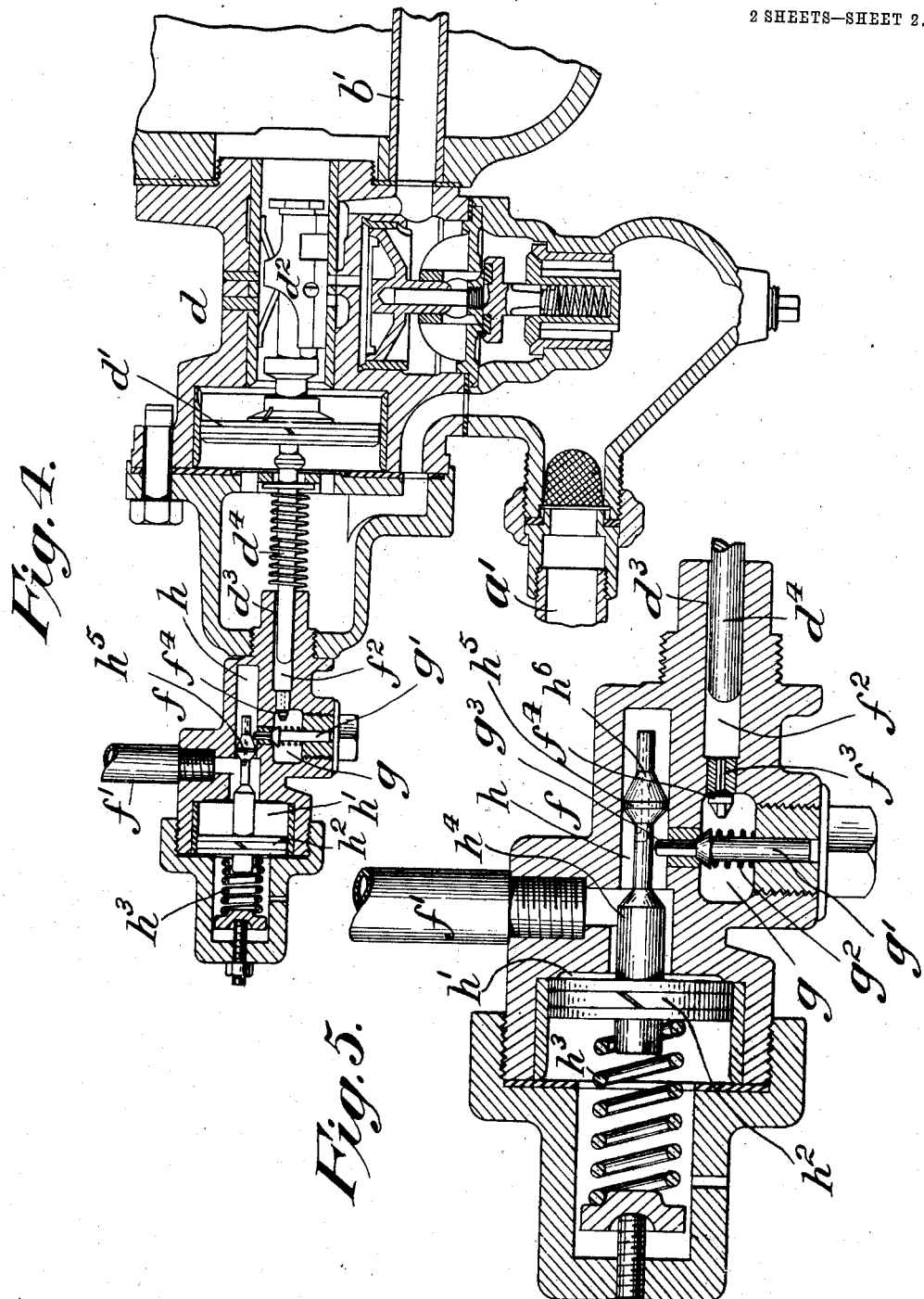

WILLIAM H. SAUVAGE, OF NEW YORK, N. Y.

FLUID-PRESSURE BRAKE SYSTEM.

No. 902,114.　　　Specification of Letters Patent.　　Patented Oct. 27, 1908.

Application filed May 28, 1908.　Serial No. 435,382.

*To all whom it may concern:*

Be it known that I, WILLIAM H. SAUVAGE, a citizen of the United States, residing in the borough of Manhattan, of the city of New York, in the State of New York, have invented certain new and useful Improvements in Fluid-Pressure Brake Systems, of which the following is a specification, reference being had to the accompanying drawings, forming a part hereof.

It is well understood that in the operation of fluid pressure brakes under certain conditions, as when a train is descending a long, steep grade and brakes must be continuously applied, it is necessary to recharge the auxiliary reservoirs from time to time, and that in order to accomplish this the engineer must have moved his valve to full release position, which would effect the release of the brakes but for the provision, on each car of the train, of a retaining valve. This valve, which is ordinarily out of operation, is usually set by the trainmen before the train reaches the top of the grade and thereafter serves to maintain a predetermined pressure in the brake cylinder, notwithstanding the movement of the engineer's valve to full release position, so that the brakes are continuously set with some pressure, though not the maximum, and the speed of the train is therefore steadied and loss of control is prevented. Nevertheless, by reason of loss of pressure through dancing of the retaining valve upon its seat, occasioned by the vibration of the car, and from leakage at various points throughout the system, the pressure under which the brakes are held when the engineer's valve is moved to full release position often and in fact usually falls more or less below the predetermined minimum which is intended to be preserved by the retaining valve.

It is the object of the present invention, therefore, to provide means for automatically restoring this pressure, whenever, from any cause, it falls below such predetermined minimum and therefore to prevent the consequences of the reduction of pressure from the causes named or from any other cause.

Other objects of the invention, incidental or subordinate to this main object, will be referred to hereinafter.

In accordance with the invention there are provided means adapted to be operated by deficiency of pressure in the brake cylinder to admit more pressure directly from the source of pressure supplied independently of the operation of the usual triple valve. Such means may be located in different relations with respect to the usual elements of the brake system and while, in certain relations, they may possess added functions, nevertheless, in all of such relations they possess the principal function, already referred to, of automatically restoring pressure in the brake cylinder.

The invention will be more fully explained hereinafter with reference to the accompanying drawings in which several different embodiments thereof are illustrated, and in which—

Figure 1 is a diagrammatic or outline view of so much of an ordinary fluid pressure brake system as is necessary to enable the application of the invention to be understood, the automatic pressure restoring device being represented as connected between the train pipe and the retaining valve pipe. Fig. 2 is a similar view, but showing the automatic pressure restoring device connected between the brake cylinder pipe and the train pipe. Fig. 3 is a detail view, in section, of an ordinary retaining valve, such as may be employed in connection with the invention. Fig. 4 is a detail view, in section, showing a triple valve of ordinary construction with the automatic restoring device supported directly thereon, a portion of the auxiliary reservoir being also shown. Fig. 5 is a detail view, in section, of the automatic pressure restoring device, on a larger scale than that of Fig. 4.

The structure shown in the drawings, except with respect to the novel features hereinafter pointed out, is of the ordinary character of fluid pressure brake construction and comprises a train pipe $a$, a brake cylinder $b$, an auxiliary reservoir $c$, a train pipe connection $a'$ between the train pipe and the triple valve $d$, a brake cylinder connection $b'$, between the triple valve $d$ and the brake cylinder $b$, indicated as passing through the auxiliary reservoir, as usual, a retaining valve $e$, and a connection $e'$ from the exhaust of the triple valve to the retaining valve. The retaining valve $e$ may be of usual construction, comprising, as shown in Fig. 3, a hand operated valve $e^2$ which may be turned so as to permit the exhaust of the triple valve to communicate directly with the atmosphere, or to communicate with the atmosphere under the control of a weighted valve $e^3$ which, under operative conditions, serves to maintain a predetermined pressure in the brake cylinder. The triple valve $d$ may also be of any ordinary or suitable construction, as indicated in Fig. 4 of the drawings, for example, having a train pipe connection at $a'$, a brake cylinder connection $b'$, an exhaust and retaining valve connection sufficiently indicated by the pipe $e'$ in Figs. 1 and 2, a piston $d'$, a slide valve $d^2$ and other parts as usual.

The automatic pressure restoring device $f$, a convenient and desirable construction of which is shown in detail in Figs. 4 and 5, is adapted to receive fluid under pressure from the train pipe $a$ and to transmit it to the brake cylinder, either directly or through the retaining valve pipe and the triple valve. To accomplish this result it may be placed in different relation to the other elements of the brake system and it may be supported in different ways. Thus, in Fig. 1, it is shown as connected across from the train pipe connection $a'$ to the retaining valve pipe $e'$, being supported by the connecting pipes. In Fig. 2, it is shown as connected across from the train pipe $a$ to the brake cylinder pipe $b'$, being supported by the connecting pipes. In Fig. 4, it is shown as supported upon the casing of the triple valve, being connected to the train pipe through the passages of the triple valve and its connection to the brake cylinder, either directly or through the retaining valve pipe, being indicated by the connection $f''$.

Referring now to the details of construction of the automatic pressure restoring device represented in the drawings and particularly in Figs. 4 and 5, it will be seen that the train pipe pressure is admitted to the device through a passage $d^3$ formed by slightly flattening the piston stem $d^4$ of the triple valve, where it rests in the bore $f^2$ of the automatic pressure restoring device. A restricted passage $f^3$, protected by a check valve $f^4$, permits the fluid under train pipe pressure to enter a valve chamber $g$, the valve $g'$ of which is held normally against its seat by a spring $g^2$ or other suitable means, which means may yield to permit the valve to open, as when its stem extension $g^3$ is acted upon by the cam hereinafter mentioned, to permit the fluid under pressure to pass into a chamber $h$ and thence, through the connection $f''$, to the brake cylinder either directly, as in the arrangement indicated in Fig. 2, or indirectly through the triple valve, as in the arrangement indicated in Fig. 1. The chamber $h$ is also in communication with a piston or diaphragm $h^2$ acted upon, in opposition to the fluid pressure communicated from the chamber $h$, by a spring $h^3$ which is properly adjusted and is of a strength proportionate to the predetermined pressure which is to be maintained in the brake cylinder. The stem $h^4$ of the valve or piston $h^2$ carries a cam $h^5$ which is adapted to coöperate with the extension $g^3$ of the valve $g'$, the stem $h^4$ being formed with a suitable passage $h^6$ to permit the pressure to be equalized on opposite sides of the cam $h^5$, which for convenience fits but travels freely within the chamber $h$. In Fig. 4, the piston $h^2$ and a cam $h^5$ are shown in operative position, while in Fig. 5 they are shown in exhaust position.

In operation, it will be understood that any reduction of pressure in the brake cylinder is immediately felt in the chamber $h'$ and that the piston $h^2$ will be moved by the spring $h^3$ toward the right against the reduced pressure in the chamber $h'$. Such movement of the piston causes the cam $h^5$ to make contact with the extension $g^3$ of the valve $g^2$ and to force the valve from its seat, thereby permitting the fluid under train pipe pressure to enter the chamber $h$ and move the piston back against the spring $h^3$, restoring the condition of equilibrium and permitting the valve $g'$ to close again. The conditions just described exist, of course, when the retaining valve is set to retain the predetermined pressure, which predetermined pressure will be built up or restored from the train pipe as often as it is depleted by leakage or by dancing of the retaining valve. Such restored pressure is transmitted as usual to the brake cylinder either directly or through the triple valve. When, however, the triple valve is inoperative, so that no back pressure is retained in the retaining valve pipe or brake cylinder pipe, the piston $h^2$, not being resisted by fluid pressure, will be thrown by the spring $h^3$ from the operative position shown in Fig. 4 to the exhaust position shown in Fig. 5. As soon, moreover, as the back pressure is reëstablished in the pipe connection $f'$, the piston will be thrown back to operative position against the pressure of the spring $h^3$. The movement of the piston in either of the conditions last referred to is so rapid that the opening of the valve $g'$ by the passage of the cam $h^5$ is almost instantaneous and the volume of fluid admitted is not sufficient to affect the movement of the piston. Should it happen, through irregularities of adjustment of the brakes or defects in the brakes, that the pressure is not sufficient to throw the piston $h^2$ all the way over from the right hand position to the left hand position, nevertheless, the piston will be carried far enough to cause the cam $h^5$ to strike the extension $g^3$ of the cam $g'$, opening the latter and causing the pressure to be gradually built up by admission of fluid under pressure from the train pipe until the piston is carried clear over to its operative position. The deficiencies of a poor brake are thus compensated for and all brakes on the train have a uniform pressure and are alike irrespective of length of piston travel. If the train pipe should be ruptured, then the triple valve moves to emergency position and cuts out the exhaust port so that the automatic pressure restoring device is then cut out and ceases to have any function.

Referring now particularly to the arrangement of the automatic pressure restoring device with respect to the other elements of the brake system, shown in Fig. 2, in which said device is not connected directly to the retaining valve, but is connected directly to the brake cylinder, and, through the triple valve, indirectly to the retaining valve, being connected between the train pipe $a$ and the brake cylinder pipe $b'$, it will be obvious that so far as concerns the accomplishment of the main function, namely that of restoring the predetermined minimum pressure in the brake cylinder when it is depleted, the operation of the automatic device is the same as already described. In this relation, however, the device has an additional function as an accelerator in building up quickly the brake cylinder pressure throughout the length of the train, thus securing a quick service application of the brakes in all parts of the train and reducing very materially the time of application of the brakes where otherwise the brake pressure might not be built up quickly to the desired degree. Thus, in a very long freight train, due to the leakage of pressure from the auxiliary reservoirs back through the feed groove of the triple valve into the train pipe when the pressure therein is released, and also by reason of the friction between the moving column of fluid and the train pipe, it becomes an important factor in a very long train, and through the retardation of the transmission of pressure impulses through the length of a long train pipe, it often happens that while the brake cylinders of the cars near the head end of the train may have a good working pressure, the brake cylinders of the cars near the rear end of the train may have a very low pressure. Now it will be seen that by reason of the direct connection from the train pipe to the brake cylinder pipe through the automatic valve, the fluid will be drawn off from the train pipe at all points along its length into the brake cylinders, and the reduction of pressure in the train pipe which is necessary to cause the triple valve to perform its proper functions is the sooner established and the action of the triple valve throughout the length of the train is therefore accelerated. On the other hand, through the connection of the brake cylinder pipe to the train pipe, whenever the pressure in the brake cylinder is less than the predetermined pressure desired for the operation of the brake, the deficiency in such pressure will be immediately restored directly from the train pipe.

Should the train pipe be ruptured, the check valve $f^4$ will prevent the escape of fluid under pressure from the brake cylinder, being a necessary feature for this purpose in the arrangement shown in Fig. 2, but may be dispensed with in the arrangement shown in Fig. 1.

It will be obvious that various other changes in details of construction and arrangement might be made without departing from the spirit of the invention.

I claim as my invention:

1. In a fluid pressure brake system, means operated by deficiency of pressure in the brake cylinder and independent of the usual connection through the triple valve to admit fluid under pressure from the train pipe to the brake cylinder.

2. In a fluid pressure brake system, the combination with a brake cylinder and means to supply fluid under pressure, of a connection between the fluid pressure supply and the brake cylinder independent of the usual connection through the triple valve and means operated by deficiency of pressure in the brake cylinder to admit fluid under pressure from said fluid pressure supply to the brake cylinder.

3. In a fluid pressure brake system, the combination with a brake cylinder and train pipe, of a connection between the train pipe and the brake cylinder independent of the usual connection through the triple valve, and means operated by deficiency of pressure in the brake cylinder to admit fluid under pressure from the train pipe to the brake cylinder.

4. In a fluid pressure brake system, the combination with a brake cylinder, train pipe, retaining valve and retaining valve pipe, of a connection between the train pipe and retaining valve pipe independent of the usual connection through the triple valve and means operated by deficiency of pressure in the brake cylinder to admit fluid under pressure from the train pipe to the brake cylinder.

5. In a fluid pressure brake system, the combination with a brake cylinder and a train pipe, of a connection from the brake cylinder to the train pipe independent of the usual connection through the triple valve, and a valve actuated by reduction of pressure in the brake cylinder to admit fluid under pressure from the train pipe to the brake cylinder.

6. In a fluid pressure brake system, the combination with a brake cylinder and a train pipe, of a connection between the train pipe and the brake cylinder independent of the usual connection through the triple valve, a piston subject to the pressure in the brake cylinder, means to move the piston against a reduced brake cylinder pressure and a valve actuated by the movement of the piston to admit fluid under pressure.

This specification signed and witnessed this 16th day of May, A. D., 1908.

WILLIAM H. SAUVAGE.

In the presence of—
W. B. GREELEY,
AMBROSE L. O'SHEA.